United States Patent
Lee (10) Patent No.: US 8,004,202 B2
(45) Date of Patent: Aug. 23, 2011

(54) APPARATUS AND METHOD FOR DRIVING BACKLIGHT

(75) Inventor: Changho Lee, Gyeongbuk (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 12/714,707

(22) Filed: Mar. 1, 2010

(65) Prior Publication Data
US 2010/0149088 A1 Jun. 17, 2010

Related U.S. Application Data

(62) Division of application No. 11/320,566, filed on Dec. 30, 2005, now Pat. No. 7,701,147.

(30) Foreign Application Priority Data

Jun. 29, 2005 (KR) .............................. 056859/2005

(51) Int. Cl.
*H05B 37/00* (2006.01)

(52) U.S. Cl. ...................... 315/219; 315/277; 315/307
(58) Field of Classification Search .................. 315/219, 315/277, 307, 291, 244, 276
See application file for complete search history.

(56) References Cited

U.S. PATENT DOCUMENTS

| | | | |
|---|---|---|---|
| 4,629,943 | A | 12/1986 | Ponce, Jr. |
| 7,358,687 | B2 | 4/2008 | Lee et al. |
| 2006/0055679 | A1 | 3/2006 | Grinshpoon et al. |
| 2006/0158131 | A1* | 7/2006 | Mitsuyasu et al. ........ 315/209 R |

* cited by examiner

*Primary Examiner* — David Hung Vu
(74) *Attorney, Agent, or Firm* — Morgan, Lewis & Bockius LLP (57) ABSTRACT

An apparatus for driving a backlight includes a controller for driving a lamp; a limiter for preventing the controller from driving the lamp during a contact condition of the lamp; and means for disabling the limiter during a first time of the controller, wherein the controller drives the lamp from a zero condition to the contact condition during the first time of the controller.

9 Claims, 7 Drawing Sheets

APPARATUS AND METHOD FOR DRIVING BACKLIGHT

This application is a Divisional of application Ser. No. 11/320,566, filed Dec. 30, 2005 now U.S. Pat. No. 7,701,147. This invention claims the benefit of Korean Patent Application No. 056859/2005 filed in Korea on Jun. 29, 2005, which is hereby incorporated by reference in its entity.

BACKGROUND OF THE INVENTION

1. Field of the Invention

The present invention relates to a backlight, and more particularly, to an apparatus and method for driving a backlight.

2. Description of the Related Art

Flat panel displays include plasma display panels, field emission displays, light emitting diodes, and liquid crystal display devices. Such flat panel displays are generally classified into emissive type flat panel displays and non-emissive type flat panel displays. Plasma display panels, field emission displays, and light emitting diodes are examples of emissive type flat panel displays.

Liquid crystal display devices are examples of non-emissive type flat panel displays. A liquid crystal display (LCD) is not self-luminous because it is a non-emissive type flat panel display. Thus, the LCD requires an external light source for displaying images.

Hence, a backlight is provided on a rear side of the LCD. Therefore, the LCD device can display images even in a dark environment by using light transmitted from the backlight assembly. The backlight assembly is required to provide high and uniform brightness, is highly efficient, has a long life, is thin and light, and costs less. For example, notebook computer monitors require a high-efficiency, long-life backlight assembly to reduce power consumption, and computer monitors and TV displays require a high-brightness backlight assembly.

The backlight assembly uses a lamp as a light source. Depending on the location of the lamp, the backlight assembly is classified as an edge type backlight assembly or a direct type backlight assembly. In the edge type backlight assembly, the lamp is disposed at a side of the LCD device and projects light in a horizontal direction. Then, a light guide plate directs the projected light to a liquid crystal panel at the front of the LCD device. In contrast, in the direct type backlight assembly, several lamps are arranged at uniform intervals. The lamps project light directly onto the liquid crystal panel at the front of the LCD device.

As discussed above, the backlight assembly must provide a high-brightness characteristic. As an example, the backlight assembly may use a cold cathode fluorescent lamp (CCFL) to achieve high-brightness. The backlight assembly incorporating the CCFL uses a step-up transformer to convert a low AC voltage of several tens of kilohertz (KHz) obtained from an inductive-capacitive (LC) resonant inverter into a high voltage required for discharging the CCFL. Here, the LC resonant inverter outputs a sinusoidal waveform. Although the LC resonant inverter is a relatively simple and highly efficient device, a single inverter can hardly drive several CCFLs in parallel. Hence, when using CCFLs, the edge type or direct type backlight assembly requires as many inverters as the number of CCFLs.

To avoid the drawbacks of the CCFL and provide high-brightness and high-efficiency characteristics for larger LCD devices, and long-lifespan and light-weight characteristics, an external electrode fluorescent lamp (EEFL) has been developed for the backlight assembly by forming an external electrode on an electrodeless glass tube.

The direct type backlight assembly can be constructed using a plurality of EEFLs by arranging the EEFLs on a reflection plate. In this case, a high brightness of several tens of thousands candelas per square meter ($cd/m^2$) can be attained by driving the EEFLs at several megahertz (MHz). A single inverter can drive several such EEFLs connected in parallel.

If a plurality of EEFLs is driven in this way, a significantly large current may flow out of an output terminal of the inverter, that is, an output terminal of a transformer. Since this large current could be fatal to the human body, a protective limiting current circuit (LCC) is provided in the backlight assembly to turn off the EEFLs and prevent electrocution of a user.

Figure 1:
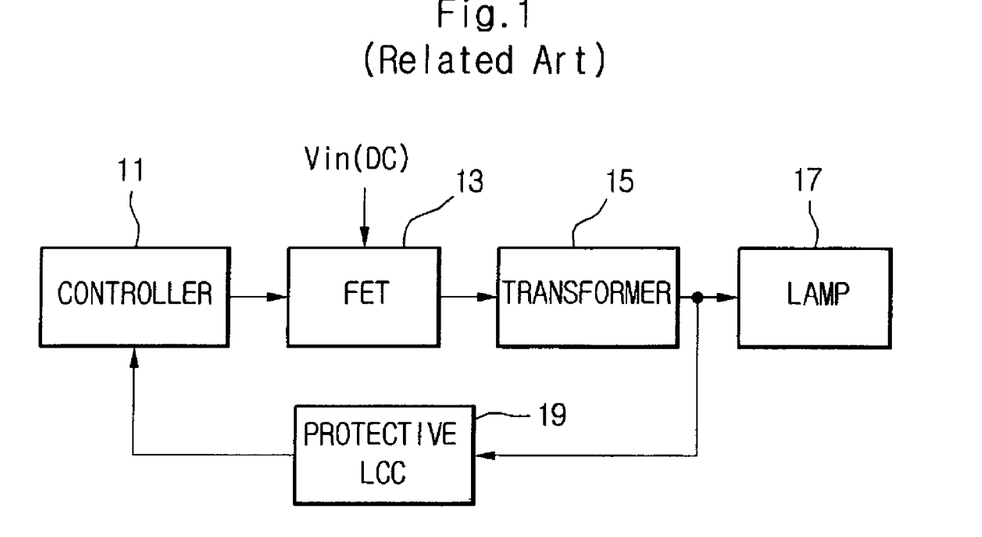
FIG. 1 is a block diagram showing a backlight driving device provided with an EEFL according to the related art.
Figure 2:
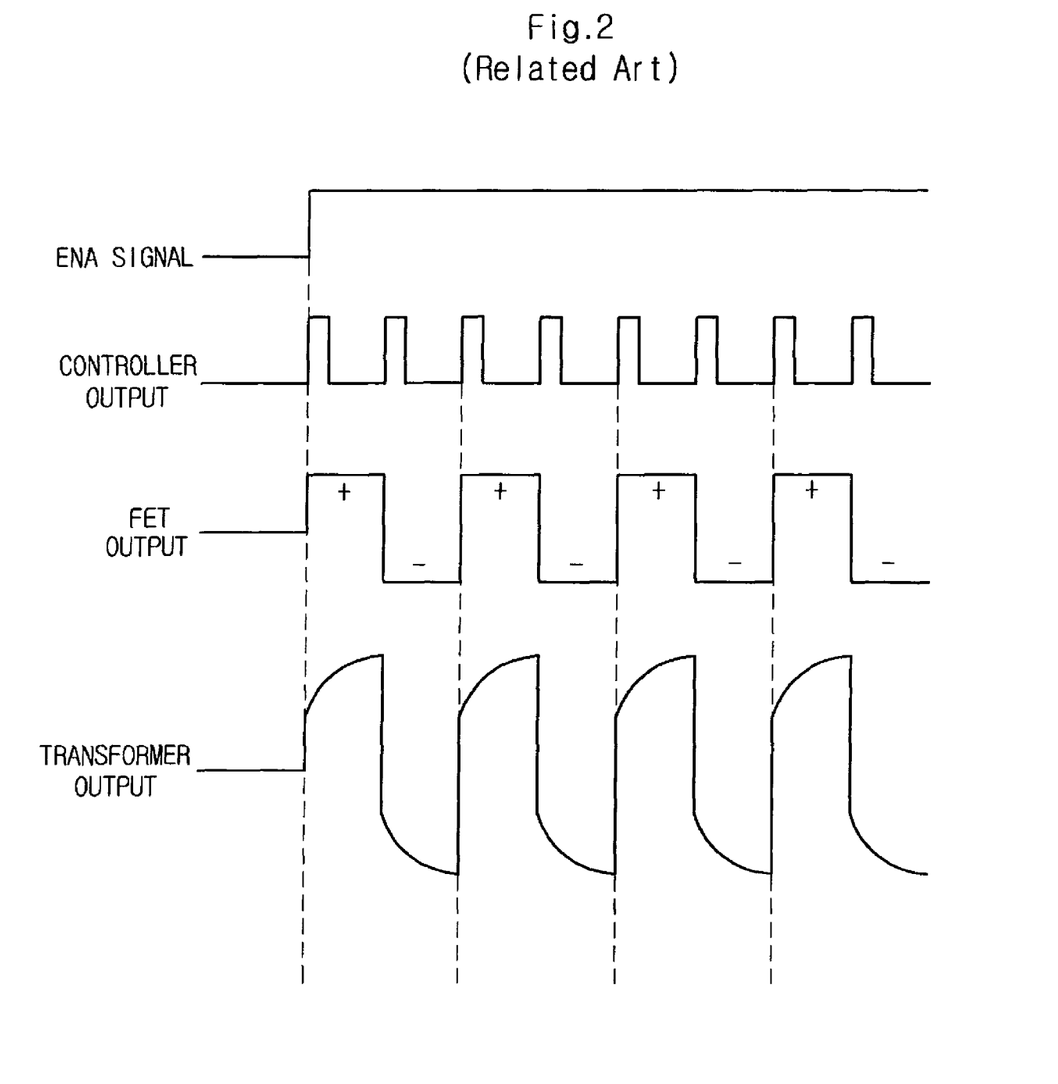
FIG. 2 is a graph showing voltage waveforms through the backlight driving device of FIG. 1.

FIG. 1 is a block diagram showing a backlight driving device provided with an EEFL according to the related art, and FIG. 2 is a graph showing voltage waveforms through the backlight driving device of FIG. 1. Referring to FIGS. 1 and 2, a controller 11 outputs a pulse width modulation (PWM) controller output signal to an FET 13 to drive a lamp 17 according to a PWM method. A DC voltage Vin (DC) is externally applied to the FET 13. In the FET 13, four transistors (not shown) are connected in parallel with one capacitor (not shown) in-between. The FET 13 outputs a FET output signal. A first pulse of the FET output signal produces a positive DC square voltage, and a second pulse of the FET output signal produces a negative DC square voltage. Thus, the FET 13 alternately outputs a positive DC square voltage and a negative DC square voltage in response to the continuously inputted pulses of the controller output signal.

The transformer 15 boosts each DC square voltage to a predetermined level and outputs the boosted voltages to the lamp 17. The lamp 17 includes a plurality of EEFLs connected in parallel with respect to the transformer 15.

Meanwhile, electrical characteristics of the transformer 15 or the lamp 17, such as voltage and current, are detected at an output side of the transformer 15. For instance, the voltage and current characteristics are measured between the transformer and the lamp 17. The detected electrical characteristics are supplied to a protective LCC 19.

If a human body comes in contact with an output of the transformer 15, the protective LCC 19 supplies an enable signal to the controller 11 to turn off the lamp 17. If there is no contact by a human body, the protective LCC 19 does not supply any signal to the controller 11, such that the backlight can be normally operated. For this, the protective LCC 19 determines whether the enable signal is to be supplied depending on the detected electrical characteristics.

A voltage of about 1500 V is provided to drive the lamp 17. However, the voltage decreases to a value equal to or lower than about 200 V if there is a contact with a human body having a resistance of about 2 k$\Omega$. Thus, the protective LCC 19 supplies the enable signal to the controller 11 only when the voltage of the second side of the transformer 15 is about 200 V, and, otherwise, supplies no signal to the controller 11.

Figure 3:
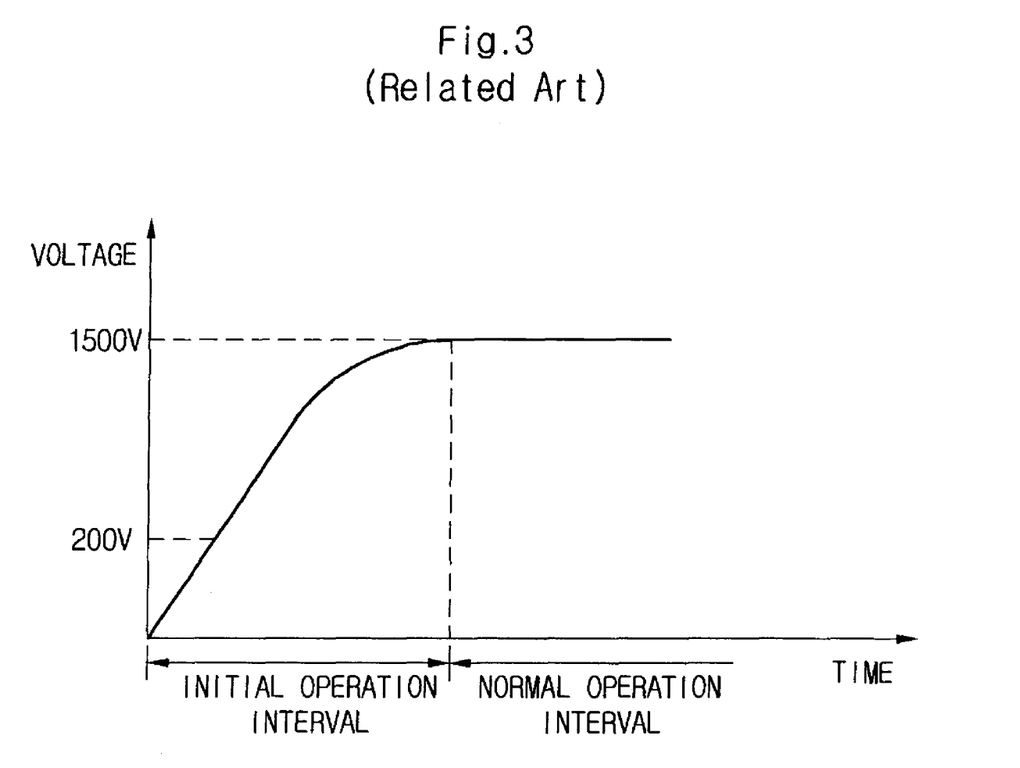
FIG. 3 is a graph of a current-voltage characteristic of the backlight driving device of FIG. 1.

FIG. 3 is a graph of a current-voltage characteristic of the backlight driving device of FIG. 1. Referring to FIG. 3, when the transformer 15 is initially operated, it takes a rising time period for the output voltage of the transformer 15 to increase from 0 V to 1500 V. While increasing, the output voltage of the transformer 15 inevitably passes through a value of 200 V, which corresponds to the output voltage when a human body is contacted.

Thus, when the output voltage of the transformer 15 increases from 0 V to 200 V during the initial rising time, the protective LCC 19 determines that a human body is contacted and supplies an enable signal to the controller 11 to turn off the lamp 17, although there is no actual contact with a human body. Accordingly, the backlight assembly stops operating. Specifically, the protective LCC 19 improperly turns off the lamp 17 in response to the transformer output voltage reaching 200 V during the initial operation of the backlight assembly.

Thus, during startup, the related art backlight assembly functions improperly when it reaches a voltage of about 200 V corresponding to the human body contact voltage. Further, even if the related art backlight assembly is manually reset after the improper shutdown of the lamp during startup, the lamp keeps shutting down every time the backlight assembly is operated. Thus, proper operation of the backlight assembly is prevented.

SUMMARY OF THE INVENTION

Accordingly, the present invention is directed to an apparatus and method for driving a backlight that substantially obviates one or more problems due to limitations and disadvantages of the related art.

An object of the present invention is to provide an apparatus and method for driving a backlight that can prevent a malfunction of the backlight.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for driving a backlight includes a controller for driving a lamp; a limiter for preventing the controller from driving the lamp during a contact condition of the lamp; and means for disabling the limiter during a first time of the controller, wherein the controller drives the lamp from a zero condition to the contact condition during the first time of the controller.

In an other aspect, an apparatus for driving a backlight includes a controller for providing a pulse signal and a control signal having a first time interval; an FET for converting the pulse signal from the controller; a transformer for boosting the converted pulse signal into a lamp driving signal to drive a lamp; a protective circuit outputting an enabling signal to the controller in response to the lamp driving signal; and means for preventing the protective circuit from outputting of the enabling signal during the first time interval.

In another aspect, a method for driving a backlight includes driving a lamp with a controller; using a limiter to prevent the controller from driving the lamp during a contact condition of the lamp, except during a first time of the controller, wherein the controller drives the lamp from a zero condition to the contact condition during the first time of the controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 4:
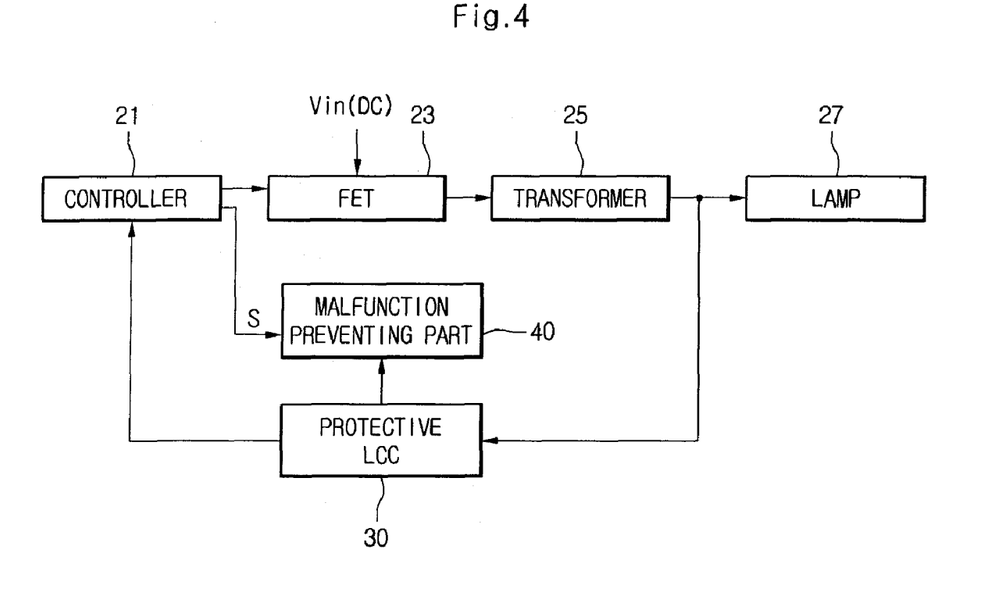
FIG. 4 is a block diagram showing an exemplary backlight driving device according to an embodiment of the present invention.

FIG. 4 is a block diagram showing an exemplary backlight driving device according to an embodiment of the present invention. Referring to FIG. 4, a backlight driving device 20 includes a controller 21, an FET 23, and a transformer 25 driving a lamp 27. The controller 21 outputs a controller output signal to the FET 23 for driving the lamp 27. For example, the controller output signal can be a pulse width modulation (PWM) signal to drive the lamp 27 according to a PWM method.

The FET 23 alternately outputs a positive DC square voltage and a negative DC square voltage in response to the continuously inputted pulses of the PWM signal from the controller 21. A DC voltage Vin (DC) is also externally provided to the FET 23.

The transformer 25 boosts each DC square voltage to a predetermined level, for example, to about 1500 V, and outputs the boosted voltage to the lamp 27. The lamp 27 can be CCFL or EEFL. In an embodiment, the lamp 27 includes a plurality of CCFLs electrically connected in parallel with respect to the transformer 25. In an other embodiment, the lamp 27 may include a plurality of EEFLs connected in parallel with respect to the transformer 25.

The backlight driving device 20 includes a protective limiting current circuit (LCC) 30 to protect a user from potential electrocution. The protective LCC 30 is connected to the output of the transformer 25 to monitor the output voltage Vo of the transformer 25. When a human body comes into contact with the output of the transformer 25, the human body resistance causes the output voltage Vo to drop to a human body contact voltage Vc. For example, the contact voltage Vc can be about 200V. Thus, the protective LCC 30 shuts down the lamp 27 when the transformer output voltage Vo is equal to or lower than the contact voltage Vc, due to contact with a human body, for example.

However, during startup operation, the transformer output voltage Vo rises from 0V to a maximum value Vmax, for example 1500V, corresponding to the driving voltage for the lamp 27. While rising, the transformer output voltage Vo can reach the contact voltage Vc, for example, about 200V, which is lower than the maximum transformer output voltage Vmax, for example 1500V.

A malfunction preventing part 40 is provided to prevent the protective LCC 30 from erroneously shutting down the lamp 27 during the startup period. For example, the malfunction preventing part 40 prevents the protective LCC 30 from shutting down the lamp 27 when the output voltage Vo of the transformer 25 is lower than or equal to the contact voltage Vc, for example when the output voltage is between about 0V and about 200V during the initial operation of the transformer 25. The controller 21 supplies a control signal S to the malfunction preventing part 40 to prevent the protective LCC 30 from improperly shutting down the backlight driving device 20 and turning off the lamp 27 at startup.

Figure 5:
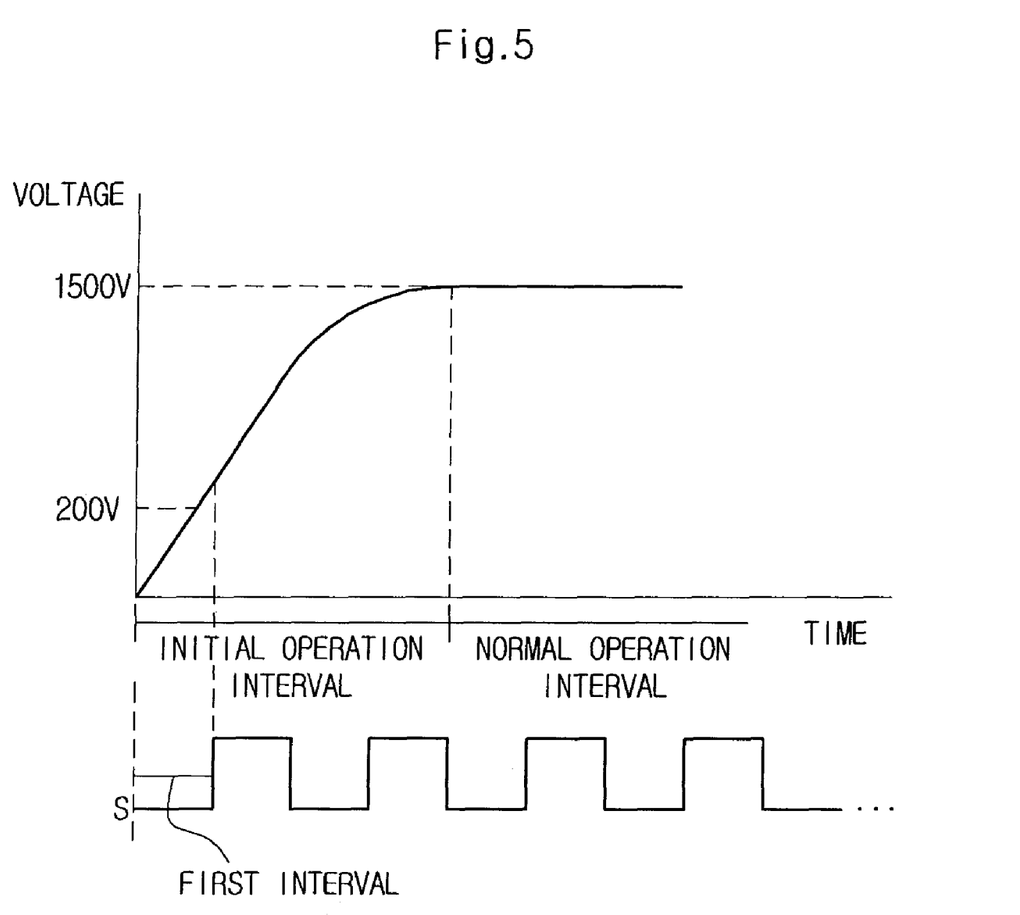
FIG. 5 is a graph of an exemplary output current-voltage characteristic in relation to an exemplary control signal in the backlight driving device of FIG. 4.

FIG. 5 is a graph of an exemplary output current-voltage characteristic in relation to an exemplary control signal in the backlight driving device of FIG. 4. Referring to FIG. 5, the transformer output voltage Vo from the transformer 25 gradually increases from 0 V due to an internal resistance or impedance to reach a desired voltage maximum voltage Vmax, for example 1500 V, after an initial operation time interval. Then, the transformer 25 continuously outputs the desired voltage Vmax during a normal operation interval. As shown in FIG. 5, the control signal S from the controller 21 may be a square waveform with alternating low and high levels. During a first time interval corresponding the startup time of the backlight driving device 20, the control signal S has a low level. For example, the first time interval of the control signal S corresponds to a rising time for the transformer output voltage V0 to reach or exceed the value of the contact voltage Vc.

Figure 6:
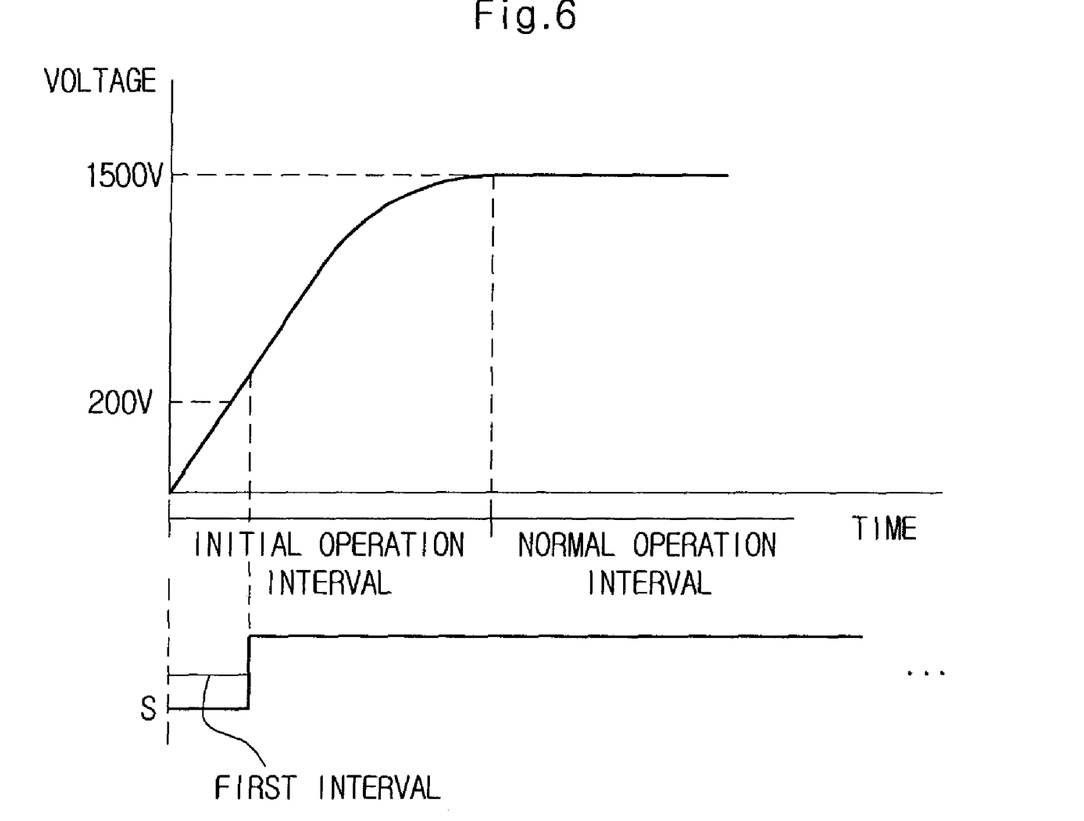
FIG. 6 is a graph of an exemplary output current-voltage characteristic in relation to another exemplary control signal in the backlight driving device of FIG. 4.

FIG. 6 is a graph of an exemplary output current-voltage characteristic in relation to another exemplary control signal in the backlight driving device of FIG. 4. Referring to FIG. 6, the control signal S may alternatively be a step signal having a low level during a first time interval corresponding to the startup time of the backlight driving device 20, and a high level in the remaining time period, including during normal operation of the backlight driving device 20. As described above, the first time interval of the control signal S corresponds to the rising time for the transformer output voltage V0 to reach or exceed the value of the contact voltage Vc.

In an embodiment, during the initial rising time when the transformer output voltage Vo increases from 0 V to the contact voltage Vc, the low voltage value of the control signal S from the controller 21 causes the malfunction preventing part 40 to disable the protective LCC 30. Thus, the protective LCC 30 is prevented from improperly shutting down the backlight driving device 20 and turning off the lamp 27 at startup time. When the transformer output voltage Vo reaches or exceeds the contact Vc, for example, 200V, the malfunction preventing part 40 enables operation of the protective LCC 30. Thus, the protective LCC 30 can properly shut down the backlight driving device 20 and turn off the lamp 27 when the transformer output voltage Vo reaches the contact voltage Vc during normal operation of the backlight driving device 20.

According to an embodiment of the present invention, an improper shutdown of the backlight driving device during startup is prevented. Thus, the backlight driving device can operate stably and reliably by disabling the protective LCC during the initial startup time.

Figure 7:
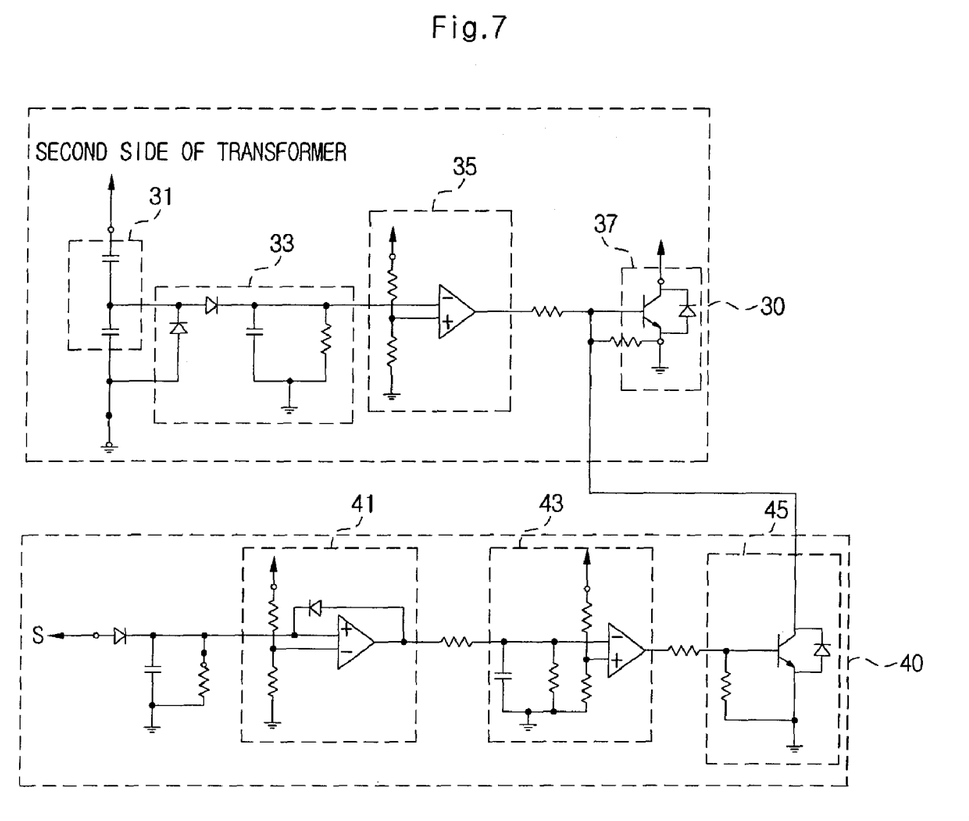
FIG. 7 shows detail circuit diagrams of an exemplary malfunction preventing part and an exemplary protective LCC for the backlight driving device of FIG. 4.

FIG. 7 shows detail circuit diagrams of an exemplary malfunction preventing part and an exemplary protective LCC for the backlight driving device of FIG. 4. Referring to FIG. 7, the protective LCC 30 includes a detecting unit 31, a rectifying unit 33, a first comparing unit 35, and a first switching unit 37.

The detecting unit 31 is connected to the output of the transformer 25 to detect the transformer output voltage Vo. The rectifying unit 33 converts the voltage detected by the detecting unit 31 into a DC voltage.

The first comparing unit 35 compares the converted DC voltage with a reference voltage to output a predetermined voltage level. A negative (−) terminal of the first comparing unit 35 is connected to the rectifying unit 33, and a positive (+) terminal of the first comparing unit 35 is connected to a reference voltage. Thus, the DC voltage at the input of the first comparing unit 35 can be inverted. For example, if the DC voltage is larger than the reference voltage, a low level voltage is outputted, and if the DC voltage is lower than the reference voltage, a high level voltage is outputted. Here, it is preferable that the reference voltage be higher than the contact voltage Vc, for example at least 200 V. Thus, when a transformer output voltage Vo equal to the contact voltage Vc corresponding to human body contact is detected by the detector 31 and rectified by the rectifier 33, a high level voltage can be outputted by the first comparing unit 35. Hence, the high level voltage is outputted by the first comparing unit 35 whenever the DC voltage at the input of the comparator 35 is lower than the reference voltage.

The first switching unit 37 outputs an ENA signal depending on the output of the first comparing unit 35. The first switching unit 37 can include a bipolar junction transistor (BJT), for example. The first switching unit 37 includes a base terminal connected to the first comparing unit 35, a collector terminal for outputting the ENA signal, and an emitter terminal connected to the ground. For example, if the first comparing unit 35 outputs a high level voltage, the ENA signal is outputted. Otherwise, if the first comparing unit 35 outputs a low level voltage, no ENA signal is outputted.

The malfunction preventing part 40 includes an amplifying unit 41, a second comparing unit 43, and a second switching unit 45. The amplifying unit 41 amplifies the control signal S supplied from the controller 21 by a predetermined gain.

The second comparing unit 43 outputs a predetermined voltage by comparing the amplified signal with a reference voltage. A negative (−) terminal of the second comparing unit 43 is connected to the amplifying unit 41, and a positive (+) terminal of the second comparing unit 43 is connected to the reference voltage, such that an input level of the second comparing unit 43 can be inverted. For example, if the amplified input voltage is larger than the reference voltage, a low level voltage is outputted by the second comparing unit 43, and if the input level is lower than the reference voltage, a high level voltage is outputted by the second comparing unit 43.

The second switching unit 45 of the malfunction preventing part 40 includes a base terminal connected to the second comparing unit 43, a collector terminal connected between the first comparing unit 35 and the first switching unit 37, and an emitter terminal connected to the ground. The second switching unit 45 can include a BJT, for example. The second switching unit 45 is turned on when the second comparing unit 43 applies a high level voltage to the base terminal of the second switching unit 45. Then, the base terminal of the first switching unit 37 is electrically connected to ground through the turned on second switching unit 45. Thus, the base terminal of the first switching unit 37 is maintained at a low level by being shorted to ground, irrespective of the level of the output signal of the first comparing unit 35. That is, the first switching unit 37 is turned off when the second switching unit 45 switches on, whether the output signal of the first comparing unit 35 is at a high level or at the low level.

Alternatively, the second switching unit 45 is turned off when the second comparing unit 43 applies a low level voltage to the base terminal of the second switching unit 45. Then, the base terminal of the first switching unit 37 is no longer shorted to ground. In this case, the voltage level at the base terminal of the first switching unit 37 is determined by the output signal from the first comparing unit 35 of the protective LCC 30. Thus, the voltage level at the base terminal of the first switching unit 37 becomes high if the output signal from the first comparing unit 35 is at a high level. And, the voltage level at the base terminal of the first switching unit 37 becomes low if the output signal from the first comparing unit 35 is at a low level.

Thus, in accordance with an embodiment of the present invention, the second switching unit 45 forces the base terminal of the first switching unit 37 to remain low for a predetermined time interval, thereby switching off the first switching unit 37, regardless of the level of the output signal from the first comparing unit 35 of the protective LCC 30. Here, the predetermined time interval corresponds to the rising time interval required for the transformer output voltage Vo to rise from 0 V to the contact voltage Vc during the initial operation. During the predetermined time interval, the base terminal of the first switching unit 37 of the protective LCC 30 is kept at a low level by the second switching unit 45 of the malfunction preventing part 40. Thus, the first switching unit 37 is turned off by the second switching unit 45, thereby preventing the ENA signal to be supplied to the controller 21. Accordingly, the backlight driving device can be normally operated without malfunction.

A method for preventing a malfunction of the backlight driving device will now be described. Referring back to FIG. 4, the controller 21 supplies a PWM signal to the FET 23 to drive the lamp 27. Concurrently, the controller 21 provides a control signal S to the malfunction preventing part 40 to prevent a malfunction.

The FET 23 outputs a DC square voltage waveform with alternating positive and negative components based on the PWM signal and supplies the DC square wave to the transformer 25. The transformer 25 boosts the level of the DC square voltage waveform and supplies the boosted DC square voltage waveform, that is the controller output voltage Vo, to the lamp 27 and the protective LCC 30. The lamp 27 is activated by the applied voltage from the transformer 25 to emit light.

As shown in FIG. 5, during an initial operation interval, the transformer output voltage Vo increases from a value of about 0V to a maximum output voltage Vmax, for example about 1500 V. The maximum output voltage Vmax corresponds to the driving voltage of the lamp 27. During a normal operation interval following the initial operation interval, the transformer output voltage Vo remains at the maximum value Vmax.

When, during the normal operation interval, when contact with a human body causes the transformer output voltage to drop to a level lower than the contact voltage Vc, for example 200V, the protective LCC 30 outputs a ENA signal to the controller 21 for shutting down the lamp 27. In contrast, during the initial operation interval, even if the transformer output voltage drops to a level lower than the contact voltage Vc, the malfunction preventing part 40 prevents the protective LCC 30 from outputting the ENA signal to the controller 21.

The malfunction preventing part 40 responds to the control signal S to prevents the protective LCC 30 from supplying the ENA signal to the controller 21 during the initial operation interval, when the transformer output voltage is still rising in a range of about 0 V to about 200 V.

Referring to FIG. 7, when the detecting unit 31 of the protective LCC 30 outputs a detected voltage in a range of 0 to Vc, the first comparing unit 35 compares the detected voltage with a reference voltage. Here, the reference voltage is equal to or higher than Vc. Thus, the reference voltage is larger than the detected voltage. Therefore, the first comparing unit 35 outputs a high level voltage.

The controller 21 provides the control signal S with alternating low and high levels to the malfunction preventing part 40. The control signal S has a low level during a first time interval corresponding to the time for the transformer output voltage to rise from 0 to Vc or higher. For example, the first interval may be the time required for the transformer output voltage Vo to increase from 0 V to 220 V. Then, the low level control signal in the first time interval is amplified by the amplifying unit 41 and inverted by the second comparing unit 43. Since a low level voltage lower than the reference voltage is inputted to the second comparing unit 43, the second comparing unit 43 outputs a high level voltage to turn on the second switching unit 45, such that the base terminal of the first switching unit 37 electrically connected to the collector terminal of the second switching unit 45 can be maintained at a low level.

As described above, the first comparing unit 35 of the protective LCC 30 outputs a high level voltage when the detected voltage is in a range of 0 to Vc. In this case, the second comparing unit 43 of the malfunction preventing part 40 outputs a high level voltage in response to a low level value of the control signal S during the first time interval. The high level voltage from the second comparing unit 43 causes the second switching unit 45 to be turned on, and thus, the base terminal of the first switching unit 37 is forced to a low level to turn off the first switching unit 37. Thus, the first switching unit 37 is prevented from outputting the ENA signal to the controller 21, thereby preventing a malfunction of the protective LCC 30.

Moreover, when the transformer output voltage Vo becomes higher than the contact voltage Vc, the second switching unit 45 does not prevent the first switching unit 45 from responding to the output signal from the first comparator 35. Thus, following the initial operation interval, the first switching unit 37 provides the ENA signal is supplied to the controller 21, whenever the transformer output voltage becomes lower than the contact voltage Vc. Therefore, the backlight driving device can be normally operated.

As described above, according to embodiments of the present invention, the malfunction preventing part outputs a high level voltage in response to a low level value of the control signal from the controller during a first time period. The high level voltage from the malfunction preventing part causes the protective LCC to be turned off. Thus, the protective LCC is prevented from outputting an enabling signal to the controller, thereby preventing a malfunction of the protective LCC. Thus, the initial malfunction of the protective LCC is prevented by disabling the protective LCC when the transformer output voltage is lower than the human body contact voltage during the initial operation interval, thereby improving the reliability of the backlight driving device.

In an embodiment, a liquid crystal display (LCD) device is formed by attaching a thin film transistor (TFT) array substrate and a color filter (CF) substrate together to face each other with a specified cell gap therebetween, and filling the cell gap with a liquid crystal material. A plurality of gate lines are arranged at regular intervals along a horizontal direction and a plurality of data lines are arranged at regular intervals along a vertical direction on the TFT array substrate to cross each other. Crossings of the data lines with the gate lines define pixel regions. Each pixel region includes a switching device and a pixel electrode. In addition, red, green and blue color filters corresponding to the pixel regions are formed on the CF substrate. A black matrix is formed in a mesh shape that encompasses an outer edge of the color filters. The black matrix prevents color interference of light passing through the pixel regions. Furthermore, a common electrode is formed on the CF substrate. The common electrode and the pixel electrode generate an electric field through the liquid crystal material.

Hence, a backlight is provided on a rear side of the LCD. The backlight may incorporate the driving circuit described above in reference to FIGS. 4-7.

It will be apparent to those skilled in the art that various modifications and variations can be made in the apparatus and method of driving backlight of the present invention without departing from the spirit or scope of the invention. Thus, it is intended that the present invention cover the modifications and variations of this invention provided they come within the scope of the appended claims and their equivalents.

What is claimed is:

1. An apparatus for driving a backlight, comprising:
 a controller for providing a pulse signal and a control signal having a first time interval;
 a FET for converting the pulse signal from the controller;
 a transformer for boosting the converted pulse signal into a lamp driving signal to drive a lamp;
 a first means outputting an enabling signal to the controller in response to the lamp driving signal; and
 a second means for preventing the first means from outputting of the enabling signal during the first time interval,
 wherein the second means is connected to an output of the transformer to monitor an output voltage of the transformer,
 wherein the control signal is a square waveform with alternating low and high levels, the control signal has a low level during the first time interval corresponding a startup time of the backlight,
 wherein the second means responds to the control signal to prevent the first means from supplying the enabling signal to the controller during the startup time of the backlight, when the transformer output voltage is still rising in a range of about 0V to about a predetermined voltage level.

2. The apparatus according to claim 1, wherein the first means provides the enabling signal to the controller, and the controller turns off the lamp in response to the enabling signal.

3. The apparatus according to claim 1, wherein the lamp driving signal increases from a ground voltage to a voltage equal to or higher than a contact voltage during the first time interval.

4. The apparatus according to claim 3, wherein the contact voltage includes a value of the lamp driving signal corresponding to a resistance of a human body.

5. The apparatus according to claim 1, wherein the first means includes a detecting unit for detecting the output of the transformer, a first comparing unit for comparing the detected output of the transformer with a reference, a rectifying unit electrically connected to an input of the first comparing unit for converting the detected output into a DC voltage, and a first switching unit switching according to a comparison result of the first comparing unit, and
 the second means includes an amplifying unit electrically connected to an input of the second comparing unit for amplifying the control signal, a second comparing unit for comparing the control signal with a reference and a second switching unit switching according to a comparison result of the second comparing unit.

6. The apparatus according to claim 5, wherein the first switching unit is switched by an output of the second switching unit.

7. The apparatus according to claim 6, wherein the second switching unit outputs a low level signal when turned on, and the first switching unit is turned off by the low level signal.

8. The apparatus according to claim 5, wherein each of the first and second switching units includes a bipolar junction transistor, and
 the second switching unit includes a base terminal connected to the second comparing unit, a collector terminal connected between the first comparing unit and the first switching unit, and an emitter terminal connected to a ground.

9. The apparatus according to claim 1, wherein the predetermined voltage level is about 200V.

* * * * *